United States Patent
Wei

(10) Patent No.: US 9,236,921 B2
(45) Date of Patent: Jan. 12, 2016

(54) METHOD AND APPARATUS FOR IMPLEMENTING MULTI-CELL PRECODING

(75) Inventor: Wei Wei, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 55 days.

(21) Appl. No.: 13/576,448

(22) PCT Filed: Aug. 25, 2011

(86) PCT No.: PCT/CN2011/078952
§ 371 (c)(1),
(2), (4) Date: Aug. 1, 2012

(87) PCT Pub. No.: WO2012/109890
PCT Pub. Date: Aug. 23, 2012

(65) Prior Publication Data
US 2014/0010151 A1    Jan. 9, 2014

(30) Foreign Application Priority Data
Feb. 15, 2011    (CN) .......................... 2011 1 0038337

(51) Int. Cl.
*H04J 11/00* (2006.01)
*H04B 7/04* (2006.01)
*H04B 7/02* (2006.01)

(52) U.S. Cl.
CPC .............. *H04B 7/0456* (2013.01); *H04B 7/024* (2013.01); *H04B 7/0465* (2013.01)

(58) Field of Classification Search
USPC ......... 370/203, 204, 211, 229, 241, 248, 252, 370/254, 255, 310, 310.2, 328, 329, 338, 370/343–344, 395.4, 431, 437, 465, 469, 370/480–481
See application file for complete search history.

(56) References Cited

U.S. PATENT DOCUMENTS 7,843,822 B1    11/2010  Paul et al.
2009/0286510 A1*  11/2009  Huber et al. .................. 455/410
(Continued)

FOREIGN PATENT DOCUMENTS

CN    1878022 A    12/2006
CN    101388699 A   3/2009
(Continued)

OTHER PUBLICATIONS

International Search Report for PCT/CN2011/078952 dated Nov. 10, 2011.

*Primary Examiner* — Kevin C Harper
*Assistant Examiner* — Mon Cheri Davenport
(74) *Attorney, Agent, or Firm* — Ling Wu; Stephen Yang; Ling and Yang Intellectual Property

(57) ABSTRACT

The present invention discloses a method and an apparatus for implementing multi-cell precoding. Users can be divided into center users and edge users according to areas, and the divided center users and edge users are processed by adopting different precoding methods. The method and apparatus of the present invention make the users located at the edge of the cell cluster and in the center of the cell cluster can be distinguished to be processed, thereby greatly optimizing and improving the rate of the entire multi-cell MIMO system; and make the interference received by the target user at users of the multi-cell edge has a clear definition and a measurement method. The aforementioned characteristics can guarantee to achieve an effective suppression for the communication interference in a heterogeneous network.

12 Claims, 2 Drawing Sheets

(56) References Cited

U.S. PATENT DOCUMENTS

| | | | |
|---|---|---|---|
| 2011/0305164 A1* | 12/2011 | Zhang et al. | 370/252 |
| 2013/0301584 A1* | 11/2013 | Addepalli et al. | 370/329 |

FOREIGN PATENT DOCUMENTS

| | | |
|---|---|---|
| CN | 101877607 A | 11/2010 |
| CN | 101931439 A | 12/2010 |
| EP | 2190130 A1 | 5/2010 |
| EP | 2403156 A1 | 1/2012 |
| JP | 2010535450 A | 11/2010 |
| JP | 2010537599 A | 12/2010 |
| JP | 2012500537 A | 1/2012 |
| JP | 2012500538 A | 1/2012 |
| WO | 2009017447 A1 | 2/2009 |
| WO | 2010048743 A1 | 5/2010 |

* cited by examiner

METHOD AND APPARATUS FOR IMPLEMENTING MULTI-CELL PRECODING

TECHNICAL FIELD

The present invention relates to the communication field, and particularly, to a method and apparatus for implementing multi-cell precoding.

BACKGROUND OF THE RELATED ART

Multi-input multi-output (MIMO) technology has made a tremendous progress from the point-to-point single link to single-cell multi-user after almost ten years of development. With the advance of next generation mobile communication technology and standards, the MIMO technology has developed from the laboratory to the practical application, and the next generation wireless technology verification system adopting the MIMO technology effectively verifies the advantage of high frequency spectrum capacity which can be provided by the MIMO technology. However, the MIMO technology in an extended multi-cell system also has a problem of other-cell interference (OCI) in the multi-antenna multi-cell. Many interference suppression techniques of single-user MIMO and multi-user MIMO can be extended to the multi-cell system to be studied, wherein some methods are based on the interference suppression techniques of single-user MIMO and multi-user MIMO, and the methods are a class of research methods used more often in the current multi-cell MIMO.

In theory, adopting the MIMO technology has a strong appeal; however, in a commercial cellular system, the interference among cells in a network, since the MIMO technology is introduced, is still very complex, and it is also a problem for a cellular MIMO system to face inevitably. Especially, in a downlink system, the pressure of interference suppression that a base station side is faced with is very large due to the limitation of processing capacity of a terminal. Therefore, gain of the system capacity provided by the MIMO is greatly reduced in a multi-cell environment. Traditional multi-cell interference elimination methods (such as soft frequency multiplexing, sectoring and spread spectrum method) is not very effective for the multi-cell MIMO system due to some limitations of the methods themselves, which is obviously not beneficial to suppressing the communication interference.

SUMMARY OF THE INVENTION

In view of this, the main purpose of the present invention is to provide a method and an apparatus for implementing multi-cell precoding, so as to guarantee to achieve an effective suppression for the communication interference in a heterogeneous network.

In order to achieve the above purpose, the technical scheme of the present invention is implemented as follows.

A method for implementing multi-cell precoding comprises:
dividing users into center users and edge users according to areas, and processing the divided center users and edge users by adopting different precoding methods.

Optionally, the aforementioned method further comprises:
introducing a collaborative distance, which indicates an interval of a cell group containing multiple cells from an inner edge to an outer edge;
proving that a Nash equilibrium point exists and is unique based on a utility function and a game theory principle, and obtaining the collaborative distance accordingly, so as to schedule the users.

Optionally, the aforementioned method further comprises and relates to a clustering process for the multiple cells:
clustering the multiple cells;
collecting channel information of a target user within a cluster and channel information of producing interference to a user;
acquiring a precoding vector of the target user.

Optionally, the step of processing the divided center users and edge users by adopting different precoding methods comprises:
adjusting the precoding vector of the target user based on power constraint;
solving precoding vectors of all users within the cell cluster;
acquiring channel interference information about the edge of the cell cluster according to the collaborative distance;
solving precoding vectors of the edge users of the cell cluster.

Optionally, the step of processing the divided center users and edge users by adopting different precoding methods comprises:
for the center users, adopting a precoding method of diagonalization of multi-cell multi-user; for the edge users, adopting a precoding method of user collaboration of the cell cluster.

An apparatus for implementing multi-cell precoding comprises an area user maintenance unit and an area user precoding unit; wherein,
the area user maintenance unit is configured to divide users into center users and edge users according to areas;
the area user precoding unit is configured to process the divided center users and edge users by adopting different precoding methods.

Optionally, the area user maintenance unit is further configured to:
introduce a collaborative distance, which indicates an interval of a cell group containing multiple cells from an inner edge to an outer edge;
prove that a Nash equilibrium point exists and is unique based on a utility function and a game theory principle, and obtain the collaborative distance accordingly, so as to schedule the users.

Optionally, the area user maintenance unit is further configured to execute a process including and involving clustering the multiple cells, which is:
clustering the multiple cells;
collecting channel information of a target user within a cluster and channel information of producing interference to a user;
acquiring a precoding vector of the target user.

Optionally, the area user precoding unit is configured to process the divided center users and edge users by adopting different precoding methods by the following way of:
adjusting the precoding vector of the target user based on power constraint;
solving precoding vectors of all users within the cell cluster;
acquiring channel interference information about the edge of the cell cluster according to the collaborative distance;
solving precoding vectors of the edge users of the cell cluster.

Optionally, the area user precoding unit is configured to process the divided center users and edge users by adopting different precoding methods by the following way of:

for the center users, adopting a precoding method of diagonalization of multi-cell multi-user; for the edge users, adopting a precoding method of user collaboration of the cell cluster.

The aforementioned method and apparatus make the users located at the edge of the cell cluster and in the center of the cell cluster can be distinguished to be processed, thereby greatly optimizing and improving the rate of the entire multi-cell MIMO system; and make the interference received by the target user at users of the multi-cell edge has a clear definition and a measurement method. The aforementioned characteristics can guarantee to achieve an effective suppression for the communication interference in a heterogeneous network.

PREFERRED EMBODIMENTS OF THE PRESENT INVENTION

Figure 1:
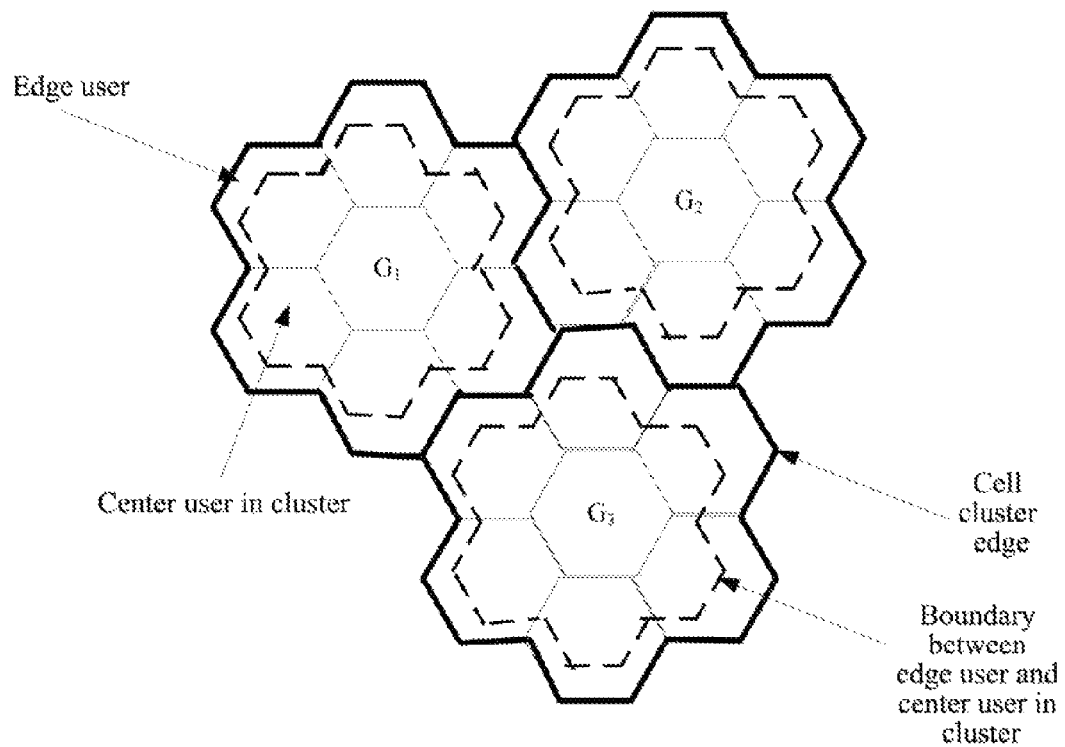
FIG. 1 is a structural diagram of multiple cells based on a clustering structure in accordance with an embodiment of the present invention.

Embodiments of the present invention will be illustrated in detail in combination with accompanying drawings hereinafter. It is needed to be illustrated that, without conflict, the embodiments and the characteristics of the embodiments in the present invention can be combined with each other randomly.

In practical applications, it can be assumed that there are N cells in a cellular network. In order to analyze conveniently, the cells in the network can be grouped, and assuming to divide into n groups, there are N/n cells in each group. For describing conveniently, assuming that there are 21 cells in a cellular network, the 21 cells in total are divided into three cell groups, there are in total 7 cells in each group, and three cell groups are respectively recorded as G1, G2 and G3.

Performing a further division, users of different areas are distinguished within each cell group, and are divided into edge users and center users; users near the center of the cell are defined as center users, and users distributed at the edge of the cell are defined as edge users. Different precoding methods can be adopted on different areas based on the above cell clustering network structure, for example: for the users located within each cell group (i.e., the center users), a precoding method of diagonalization of multi-cell multi-user can be adopted; for the users located at the edge of each cell group (i.e., the edge users), a precoding method of user collaboration of a cell cluster can be adopted.

Based on the aforementioned cell clustering idea, a single-cell precoding algorithm can be extended, and the diagonalization process of multi-cell unified block or the diagonalization process of multi-cell collaboration block is performed for the aforementioned structure. In order to analyze problems conveniently, it is assumed that a base station can acquire full channel information from a terminal in the description.

It is needed to be illustrated that distinguishing the users of different areas is very crucial whether within a cell group or within a single cell.

When precoding multiple cells within a cluster, g can be used to represent any one of the cell clusters; and assuming that there are S cells within the cluster g and there is one base station serving for one cell, then the cluster g is a MIMO network having S base stations. Assuming that each base station has the same number of antennas Nt, and the number of antennas of each terminal user is Nr, user number limitation of a BD algorithm is extended, and the number of users supported by that cell group can be obtained by:

$$k_{max} \leq \left\lfloor \frac{SN_t}{N_r} \right\rfloor \quad (1)$$

wherein, $\lfloor \Box \rfloor$ indicates choosing a maximum integer.

For any user k in the cell cluster g, a receiving signal is:

$$r_k^{(g)} = \hat{H}_k^{(g)} \sum_{i=1}^{K} F_i^{(g)} x_i^{(g)} + z_k^{(g)} \quad (2)$$

in the above equation, $\hat{H}_k^{(g)}$ is an equivalent channel going through by the user k during the receiving process, $F_i^{(g)}$ is a precoding matrix of the user i, $s_i^{(g)}$ is a sending vector signal, and $z_k^{(g)}$ is an equivalent noise of the user k.

In the cell cluster g, a set of all interference matrixes of the user k is:

$$\tilde{H}_k^{(g)} = \left[ \hat{H}_1^{(g)*} \ldots H_{k-1}^{(g)*} H_{k+1}^{(g)*} \ldots H_K^{(g)*} \right]^* \quad (3)$$

Assuming that the total number of the users is K in g, the method for finding a precoding matrix $F_k^{(g)}$ in the cell cluster is to make $\hat{H}_k^{(g)} F_k^{(g)} = 0$ in the case that the number of all transmitting antennas $SN_t$ is no less than the number of all receiving antennas $KN_r$, so that there is no interference between users.

Let $\tilde{l}_k = \text{rank}(\tilde{H}_k^{(g)})$, and then the singular value decomposition (SVD) of $\tilde{H}_k^{(g)}$ is:

$$SVD(\tilde{H}_k^{(g)}) = \tilde{U}_k^{(g)} \tilde{k}^{(g)} [\Lambda \tilde{V}_{k,1}^{(g)} \tilde{V}_{k,0}^{(g)}]^* \quad (4)$$

wherein, $\hat{V}_{k,1}^{(g)}$ contains $\tilde{l}_k$ right singular value vectors, $\tilde{V}_{k,0}^{(g)}$ refers to the $SN_t - \tilde{l}_k$ remaining vectors. For the user k, at most $\tilde{l}_k$ code streams can be sent, so that the precoding matrix $F_k^{(g)}$ of the user k can be obtained, and then the receiving signal becomes:

$$r_k^{(g)} = \hat{H}_k^{(g)} F_k^{(g)} x_k^{(g)} + z_k^{(g)} \quad (5)$$

At the side of the base station, $\bar{F}_s^{(g)} = [F_1^{(g,s)} F_2^{(g,s)} \ldots F_K^{(g,s)}]$ is defined as a precoding matrix corresponding to the base station s, and in order to guarantee a constant transmitting power, power constraint of the base station s on the precoding is:

$$tr(\bar{F}_s^{(g)} R^{(g)} \bar{F}_s^{(g)*}) \leq P \quad (6)$$

wherein, P refers to total transmitting power, $R^{(g)}$ is a covariance matrix of transmitting signal vectors of the cell group g, $R^{(g)} = [R_1^{(g)*} R_2^{(g)*} \ldots R_K^{(g)*}]^*$; $R_k^{(g)}$ is a covariance matrix $x_1^{(g)}$ of the transmitting vectors of the user k in the cell group, i.e., $R_k^{(g)} = E[x_k^{(g)} x_k^{(g)*}]$. After the above processing, the total rate of the cell group can be expressed as:

$$Rate_{cell} = \max_{tr(F_s^{(g)}R^{(g)}F_s^{(g)*}) \leq P} \sum_{k=1}^{K} \log_2 \left| I_{N_r} + \hat{H}_k^{\wedge\wedge(g)} F_k^{(g)} R_k^{(g)} F_k^{(g)*} H_k^{(g)*} \right| \quad (7)$$

In the formula (7), for any user k in the cell group, the SVD of $\hat{H}_k^{(g)}F_k^{(g)}$ is resolved to:

$$SVD(\hat{H}_k^{(g)}F_k^{(g)}) = U_k^{(g)} \begin{bmatrix} \Lambda_k^{(g)} & 0 \\ 0 & 0 \end{bmatrix} V_k^{(g)} \quad (8)$$

wherein, $\Lambda_k^{(g)} = \text{diag}(\lambda_{k,1}, \ldots, \lambda_{k,r_k})$, and $r_k = \text{rank}(H_k^{(g)}F_k^{(g)})$.

Let $\Lambda^{(g)} = \text{blockdiag}(\Lambda_1^{(g)}, \ldots, \Lambda_K^{(g)})$;

and then the total rate of the cell group can be further modified as:

$$Rate_{cell} = \max_{tr(F_s^{(g)}R^{(g)}F_s^{(g)*}) \leq P} \sum_{k=1}^{K} \log_2 \left| I_{N_r} + \Lambda^{(g)} \tilde{R}^{(g)} \Lambda^{(g)*} \right| \quad (9)$$

when precoding for the edge of the cell cluster, $\tilde{R}^{(g)}$ refers to an equivalent covariance matrix.

The case that the users at the edge of the cell group are influenced by other cell groups is not taken into account in the above technical description; when the user interference between the cell groups is considered, the maximum user number which can be supported by adopting the BD algorithm is:

$$k_{max} \leq \left\lfloor \frac{SN_t}{N_r} \right\rfloor - k_e \quad (10)$$

Figure 2:
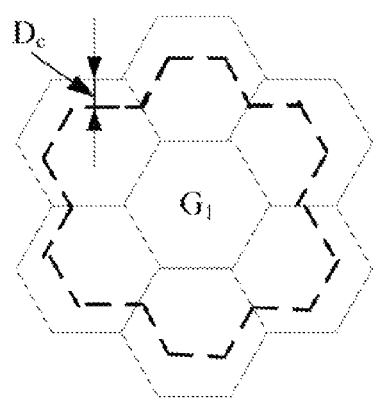
FIG. 2 is a schematic diagram of a collaborative distance in accordance with an embodiment of the present invention.

Thus, the number of users which can be supported by the system is obviously reduced, and throughput of the system is also affected. In order to balance the impact on the system capacity caused by reducing of the number of users for overcoming the interference, and in order to also achieve an optimum system capacity in that situation, a concept of a collaborative distance Dc as shown in FIG. 2 can be further introduced, and Dc refers to an interval from the inner edge of the cell group to the outer edge of the cell group.

Assuming that the collaborative distance is defined as Dc in the cell cluster G1, at the time the minimum user rate in G1 is defined as $Rate_{min}$. Taking into account that the users at the cell edge may collaborate with other cell clusters, the user rates in the Dc area will be decreased with it, therefore a parameter $\overline{Rate}_{min}$ is further defined, which indicates an average minimum rate in the cell cluster G1. Obviously, greater the collaborative distance Dc is, more the number of users in the area is, and greater $\overline{Rate}_{min}$ is. In addition, an effective rate $Rate_{eff}$ is defined, and is shown in formula (11):

$$Rate_{eff} = \sum_{k=1}^{K} \frac{Rate_k}{N_{c,k}(D_c)} \quad (11)$$

Wherein, $Rate_k$ refers to a theoretical rate of each user in the cell group, $N_{c,k}(D_c)$ refers to user collaboration between the master cell group in which the user k is located and $N_c$ adjacent cell groups. When Dc increases, the number of $N_{c,k}(D_c)$ increases, while the effective rate decreases.

It can be seen from the aforementioned analysis that, the change of Dc can result in a contradiction between a pair of the rate $Rate_{eff}$ and $\overline{Rate}_{min}$; and in order to find the optimal value of Dc to schedule the users reasonably, therefore, a utility function as shown in the following formula (12) can be constructed:

$$u(D_c) = \alpha \overline{Rate}_{min}(D_c)(1-\alpha)Rate_{eff}+(-D_c) \quad 0<\alpha<1 \quad (12)$$

Based on the game theory principle, let:

$$\frac{\partial u}{\partial D_c} = 0;$$

$D_c = f(\overline{Rate}_{min}, Rate_{eff})$ is obtained.

Taking advantage of the related art, it can be proved that a Nash equilibrium point therein exists and is unique, the reasonable value of Dc is searched finally, and a reasonable user scheduling is performed accordingly.

In a specific application, the executed operation steps comprise the following steps.

In step 1, the multiple cells is clustered reasonably.

Dividing clusters reasonably can effectively improve performance of the algorithm, the number of cells within a cluster and the number of users can be chosen according to a simulation result of a real-time channel, or based on an empirical value.

In step 2, channel information of a user k and channel information of producing interference to users in the cluster are collected.

the interference channel information corresponding to the target user k is obtained according to the following formula:

$$\tilde{H}_k^{(g)} = \left[ \hat{H}_1^{\wedge\wedge\wedge\wedge(g)*} \ldots H_{k-1}^{(g)*} H_{k+1}^{(g)*} \ldots H_K^{(g)*} \right]^*;$$

In step 3, a precoding vector of the target user k is obtained. Let $\tilde{l}_k = \text{rank}(\tilde{H}_k^{(g)})$, and then the SVD of $\tilde{H}_k^{(g)}$ is:

$$SVD(\tilde{H}_k^{(g)}) = \tilde{U}_k^{(g)} \tilde{\Lambda}_k^{(g)} [\Lambda \tilde{V}_{k,1}^{(g)} \tilde{V}_{k,0}^{(g)}]^*;$$

wherein, $\tilde{V}_{k,1}^{(g)}$ contains $\tilde{l}_k$ right singular value vectors, and $\tilde{V}_{k,0}^{(g)}$ refers to $SN_t - \tilde{l}_k$ remaining vectors. For the user k, at most $\tilde{l}_k$ code streams can be sent, so that the precoding matrix $F_k^{(g)}$ of the user k can be obtained:

$$F_k^{(g)} = \tilde{V}_{k,1}^{(g)};$$

In step 4, the precoding vector of the target user k is adjusted based on the power constraint.

On the basis of the step 3, an adjustment of the power constraint is performed on $F_k^{(g)}$. Specifically, at the side of the base station, $\overline{F}_s^{(g)} = [F_1^{(g,s)} F_2^{(g,s)} \ldots F_K^{(g,s)}]$ is defined as a precoding matrix corresponding to the base station s, and in order to guarantee the constant transmitting power, the power constraint of the base station s for the precoding is as follows:

$$tr(\overline{F}_s^{(g)} R^{(g)} \overline{F}_s^{(g)*}) \leq P;$$

In step 5, the precoding vectors of all users in the cell cluster are solved.

Solving the precoding vectors is performed on all the users in the cell cluster by adopting the same method as that in steps 3 and 4.

In step 6, a collaborative distance of the edge of the cell cluster is determined.

The collaborative distance is determined according to the expression $D_c=f(\overline{Rate}_{min}, Rate_{eff})$ of the collaborative distance $D_c$;

wherein, a parameter $\overline{Rate}_{min}$ indicates an average minimum rate in the cell cluster; in addition, an effective rate $Rate_{eff}$ is defined, as shown in the following formula:

$$Rate_{eff} = \sum_{k=1}^{K} \frac{Rate_k}{N_{c,k}(D_c)};$$

Wherein, $Rate_k$ refers to a theoretical rate of each user in the cell group, $N_{c,k}$ (4) refers to user collaboration between the master cell group in which the user k is located and $N_c$ adjacent cell groups.

In step 7, the channel interference information of the edge of the cell cluster is obtained.

The number of users located at the edge of the cell cluster can be determined according to the collaborative distance obtained in step 6; as shown in FIG. 1, it is assumed that the numbers of users at the edge of the cluster G1, cluster G2 and cluster G3 are respectively K1, K2 and K3, and then for a user k located at the edge of the cell cluster, a set of its interferences is:

$$\tilde{H}_k^{(g)} = \left[ \widehat{H_1^{(g)*}} \quad \ldots \quad H_{k-1}^{(g)*} H_{k+1}^{(g)*} \quad \ldots \quad H_{\frac{1}{3}(K_1+K_2+K_3)}^{(g)*} \right]^*$$

In step 8, the precoding vectors of the users located at the edge of the cell cluster are solved.

On the basis of the step 7, the precoding vectors of the users located at the edge of the cell cluster are solved according to the method of the step 3.

Figure 3:
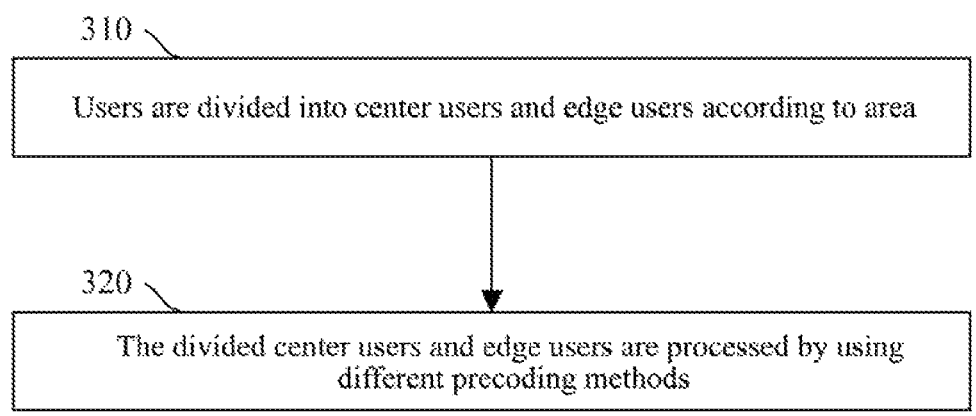
FIG. 3 is a flow chart for implementing multi-cell precoding in accordance with an embodiment of the present invention.

It can be seen in combination with the above technical description that, the operation idea for implementing multi-cell precoding can be expressed as shown in FIG. 3. Referring to FIG. 3, FIG. 3 is a flow chart for implementing multi-cell precoding in accordance with an embodiment of the present invention, and the flow comprises the following steps.

In step 310, the users are divided into center users and edge users according to the area.

In step 320, the divided center users and edge users are processed by adopting different precoding methods.

Figure 4:
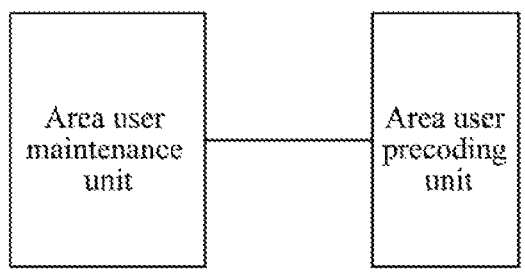
FIG. 4 is a schematic diagram of an apparatus for implementing multi-cell precoding in accordance with an embodiment of the present invention.

In order to guarantee that the above technical description can be successfully achieved, configuration as shown in FIG. 4 can be performed. Seen from FIG. 4, FIG. 4 is a schematic diagram of a device for implementing multi-cell precoding in accordance with an embodiment of the present invention, and the device comprises an area user maintenance unit and an area user precoding unit which are connected with each other.

In a practical application, the area user maintenance unit can divide users into center users and edge users according to the area, and then the area user precoding unit can process the divided center users and edge users by adopting different precoding methods.

Those skilled in the art can understand that all of or part of steps of the aforementioned method can be completed by programs instructing the corresponding hardware, and the programs might be stored in a computer readable storage medium, such as a read-only memory, a magnetic disk, or an optical disk, and so on. Alternatively, all of or part of steps of the aforementioned embodiments can be implemented with one or more integrated circuits. Correspondingly, each module/unit of the aforementioned embodiments can be implemented in the form of hardware, or can be implemented in the form of software functional modules. The present invention is not limited to any specific form of combination of hardware and software.

The above description is only the preferred embodiments of the present invention, and is not intended to limit the present invention; for those skilled in the art, the present invention can be modified and changed variously. All modifications, equivalents and improvements, which are made within the spirit and principle of the present invention, should be comprised in the protection scope of the present invention.

INDUSTRIAL APPLICABILITY

The above embodiments implement the multi-cell precoding technology, so that the users located at the edge of the cell cluster and in the center of the cell cluster can be distinguished to be processed, thereby greatly optimizing and improving the rate of the entire multi-cell MIMO system; and so that the interference received by the target user at users of the multi-cell edge has a clear definition and a measurement method. The aforementioned characteristics can guarantee to achieve an effective suppression for the communication interference in a heterogeneous network.

What is claimed is:

1. A method for implementing multi-cell precoding, comprising:
   clustering multiple cells of a cellular network;
   dividing users into center users of a cluster of multiple cells and edge users of the cluster according to locations of the users in the cluster;
   introducing a collaborative distance, which indicates an interval of a cluster of multiple cells from an inner edge of the cluster to an outer edge the cluster;
   proving that a Nash equilibrium point exists and is unique based on a utility function and a game theory principle, and obtaining the collaborative distance $D_c=f(\overline{Rate}_{min}, Rate_{eff})$, so as to schedule the users;
   wherein $\overline{Rate}_{min}$ is an average minimum rate of users in the cluster, $Rate_{eff}$ is an effective rate:

$$Rate_{eff} = \sum_{k=1}^{K} \frac{Rate_k}{N_{c,k}(D_c)}$$

wherein $Rate_k$ refers to a theoretical rate of each user in the cluster, $N_{c,k}(D_c)$ refers to user collaboration between the cluster in which a user k is located and $N_c$ adjacent clusters of multiple cells, K is the total number of users in the cluster;
   and processing the divided center users and edge users by adopting different precoding methods.

2. The method according to claim 1, further comprising:
   collecting channel information of a target user within the cluster and channel information of producing interference to a user;
   acquiring a precoding vector of the target user.

3. The method according to claim 2, wherein, the step of processing the divided center users and edge users by adopting different precoding methods comprises:
   adjusting the precoding vector of the target user based on power constraint;
   solving precoding vectors of all users within the cluster;

acquiring channel interference information about the edge of the cell cluster according to the collaborative distance $D_c$;

solving precoding vectors of the edge users of the cluster.

4. The method according to claim 1, wherein, the step of processing the divided center users and edge users by adopting different precoding methods comprises:

for the center users of a cluster of multiple cells, adopting a precoding method of diagonalization of multi-cell multi-user; for the edge users of the cluster, adopting a precoding method of user collaboration of the cluster.

5. An apparatus for implementing multi-cell precoding, comprising an area user maintenance unit and an area user precoding unit; wherein, the area user maintenance unit is configured to:
cluster multiple cells of a cellular network;
divide users into center users of a cluster of multiple cells and edge users of the cluster according to locations of the users in the cluster; and
introduce a collaborative distance, which indicates an interval of a cluster of multiple cells from an inner edge of the cluster to an outer edge of the cluster;
prove that a Nash equilibrium point exists and is unique based on a utility function and a game theory principle, and obtain the collaborative distance $D_c = f(\overline{Rate}_{min}, Rate_{eff})$, so as to schedule the users;
wherein $\overline{Rate}_{min}$ is an average minimum rate of users in the cluster, $Rate_{eff}$ is an effective rate:

$$Rate_{eff} = \sum_{k=1}^{K} \frac{Rate_k}{N_{c,k}(D_c)}$$

wherein $Rate_k$ refers to a theoretical rate of each user in the cluster, $N_{c,k}(D_c)$ refers to user collaboration between the cluster in which a user k is located and $N_c$ adjacent clusters of multiple cells, K is the total number of users in the cluster;
the area user precoding unit is configured to process the divided center users and edge users by adopting different precoding methods.

6. The apparatus according to claim 5, wherein, the area user maintenance unit is further configured to:
collect channel information of a target user within the cluster and channel information of producing interference to a user;
acquire a precoding vector of the target user.

7. The apparatus according to claim 6, wherein, the area user precoding unit is configured to process the divided center users and edge users by adopting different precoding methods by the following way of:

adjusting the precoding vector of the target user based on power constraint;
solving precoding vectors of all users within the cluster;
acquiring channel interference information about the edge of the cluster according to the collaborative distance $D_c$;
solving precoding vectors of the edge users of the cluster.

8. The apparatus according to claim 5, wherein, the area user precoding unit is configured to process the divided center users and edge users by adopting different precoding methods by the following way of:
for the center users of a cluster of multiple cells, adopting a precoding method of diagonalization of multi-cell multi-user; for the edge users of the cluster, adopting a precoding method of user collaboration of the cluster.

9. The method according to claim 2, wherein, the step of processing the divided center users and edge users by adopting different precoding methods comprises:
for the center users of a cluster of multiple cells, adopting a precoding method of diagonalization of multi-cell multi-user; for the edge users of the cluster, adopting a precoding method of user collaboration of the cell cluster.

10. The method according to claim 3, wherein, the step of processing the divided center users and edge users by adopting different precoding methods comprises:
for the center users of a cluster of multiple cells, adopting a precoding method of diagonalization of multi-cell multi-user; for the edge users of the cluster, adopting a precoding method of user collaboration of the cell cluster.

11. The apparatus according to claim 6, wherein, the area user precoding unit is configured to process the divided center users and edge users by adopting different precoding methods by the following way of:
for the center users of a cluster of multiple cells, adopting a precoding method of diagonalization of multi-cell multi-user; for the edge users of the cluster, adopting a precoding method of user collaboration of the cell cluster.

12. The apparatus according to claim 7, wherein, the area user precoding unit is configured to process the divided center users and edge users by adopting different precoding methods by the following way of:
for the center users of a cluster of multiple cells, adopting a precoding method of diagonalization of multi-cell multi-user; for the edge users of the cluster, adopting a precoding method of user collaboration of the cell cluster.

* * * * *